Feb. 22, 1927.  
H. W. WELLMAN, JR  
1,618,360  
INTERNAL COMBUSTION ENGINE  
Filed Aug. 28, 1925  
3 Sheets-Sheet 1

Inventor  
Harrison W. Wellman Jr.  
By H. J. O'Brien  
Attorney

Feb. 22, 1927.
H. W. WELLMAN, JR
1,618,360
INTERNAL COMBUSTION ENGINE
Filed Aug. 28, 1925
3 Sheets-Sheet 2

Inventor
Harrison W. Wellman Jr.
By
Attorney

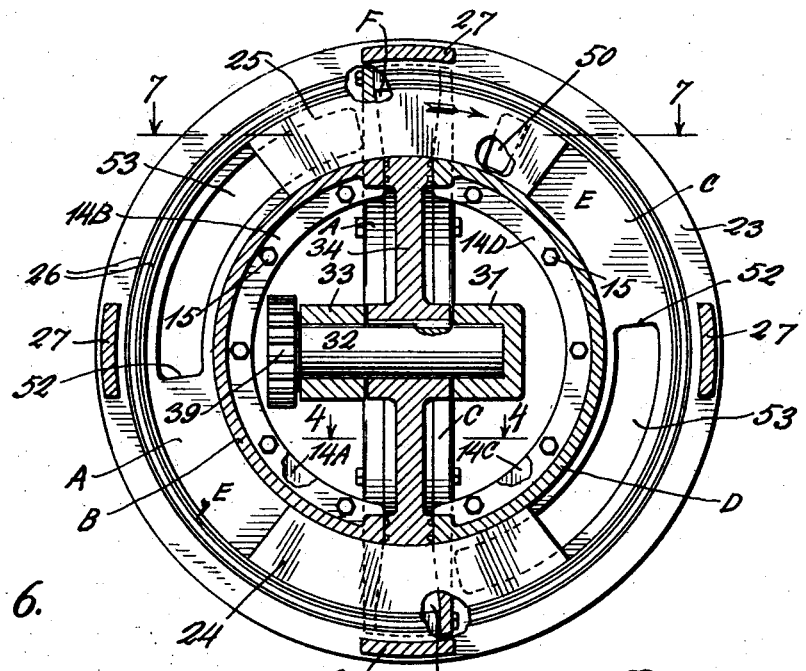
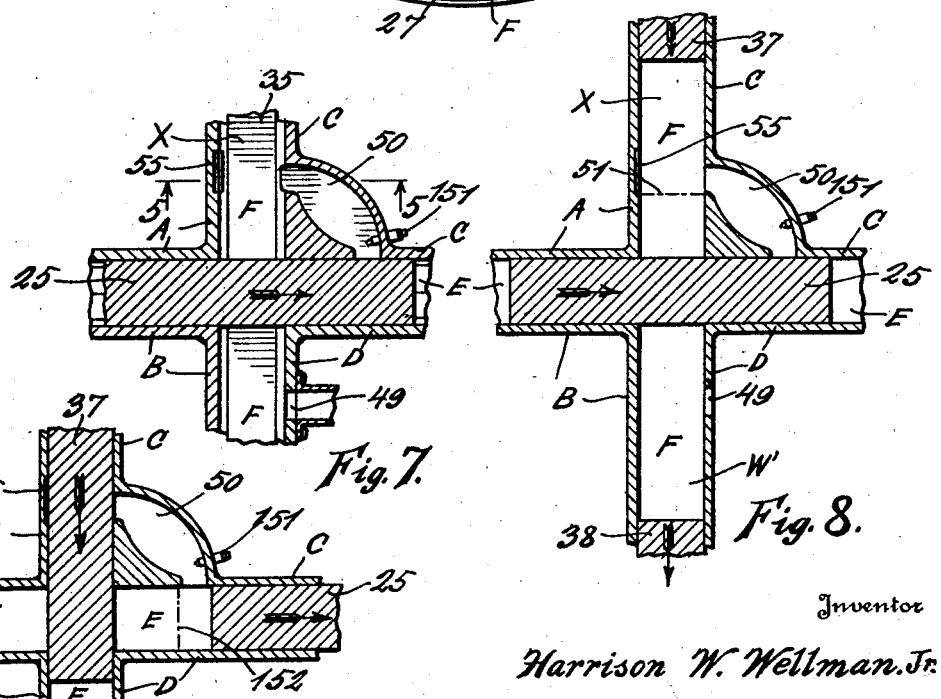

Patented Feb. 22, 1927.

1,618,360

UNITED STATES PATENT OFFICE.

HARRISON W. WELLMAN, JR., OF EDGEWATER, COLORADO.

INTERNAL-COMBUSTION ENGINE.

Application filed August 28, 1925. Serial No. 53,181.

This invention relates to improvements in the construction of internal combustion engines of the rotary piston type.

The objectionable features of the ordinary internal combustion engine of the reciprocating piston type have long been recognized and many efforts have been made to construct a successful engine in which the pistons move continuously in circular paths instead of reciprocating, as such engines would, obviously overcome the objectionable strains due to the stopping and reversing of the reciprocating parts.

It is the object of this invention to produce an engine in which the difficulties ordinarily experienced with the valve mechanism have been eliminated so as to produce as nearly as possible a noiseless operation. In addition to this and in order to obtain the desired noiseless operation I employ in my construction two circular piston devices that are mounted for rotation in intersecting planes and which are so related to each other that one of them develop the power while the other takes in and compresses the charge of explosive mixture.

In order to explain my invention so that its construction and mode of operation can be readily understood, I shall have reference to the accompanying drawings in which one embodiment of my invention has been shown and in which:

Fig. 6 is a section taken on line 6—6 Fig. 3;

Fig. 7 is a section taken on line 7—7 Fig. 6;

Fig. 8 is a view similar to that shown in Fig. 7 and shows the position of the pistons during the compression stroke, and Fig. 9 is a view similar to that shown in Figs. 7 and 8 and shows the position of the piston at the beginning of the power stroke.

Figure 1:
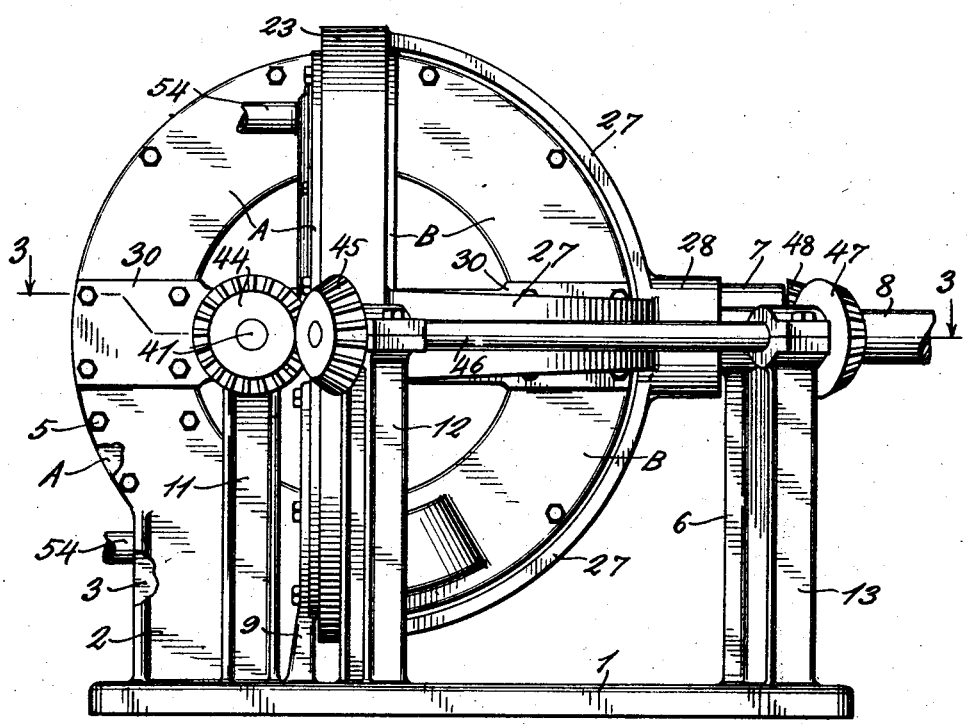
Fig. 1 is a side elevation of my engine looking in the direction of arrow 1 in Fig. 3.
Figure 2:
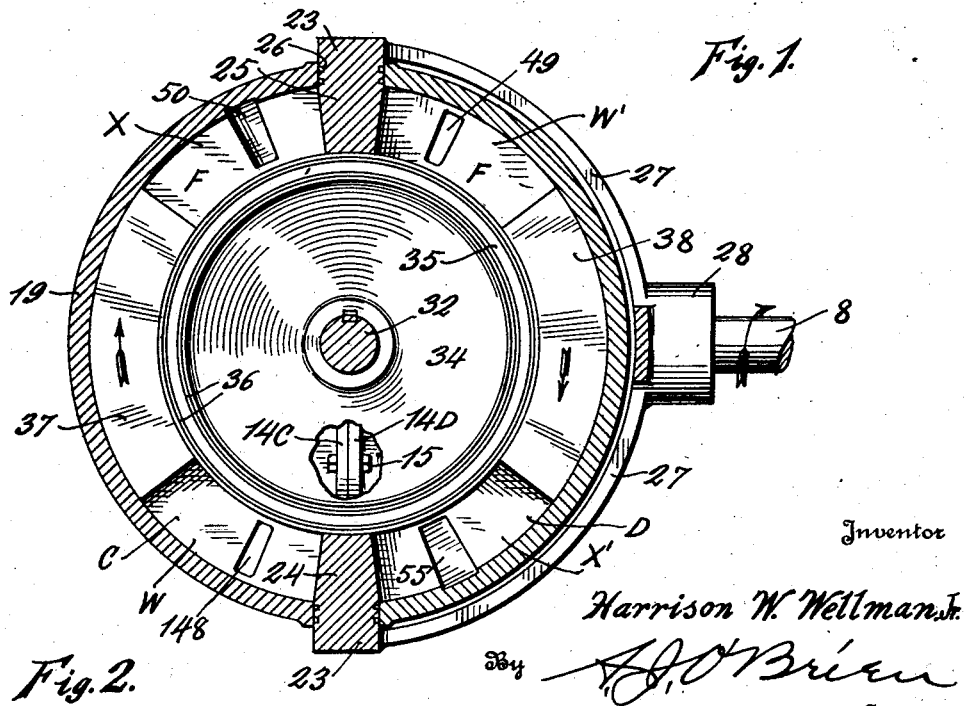
Fig. 2 is a section taken on line 2—2 Fig. 3.
Figure 3:
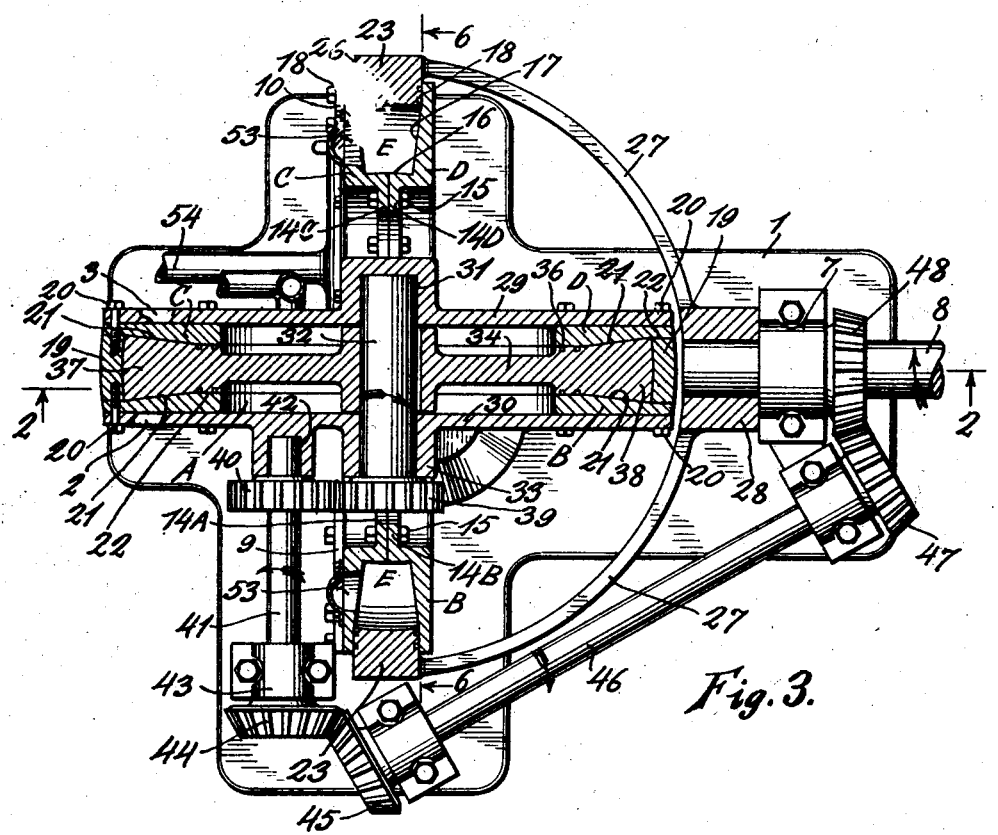
Fig. 3 is a section taken on line 3—3 Fig. 1.
Figure 4:
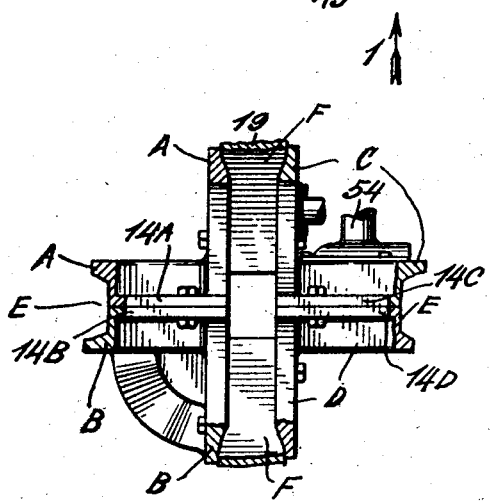
Fig. 4 is a section taken on line 4—4 Fig. 6.

My engine has been shown as consisting of a base 1, which is merely intended to show one way of supporting the engine and which should therefore be considered as illustrative only. Projecting upwardly from this base are standards 2 and 3 (Figs. 1 and 3) whose upper ends are bolted to a part of the engine by means of bolts 5 (Fig. 1). Another standard 6 extends upwardly from the base and is provided at its upper end with a bearing 7 for the reception of the drive shaft 8. Other standards 9, 10, 11, 12 and 13 extend upwardly from the base and perform functions that will be hereinafter pointed out. The engine proper comprises four somewhat similar sections A, B, C and D which are adapted to be secured together so as to form an assembly having two intersecting circular channels E and F. The parts A, B, C and D have each a circular flange that for the purpose of distinction have been given the designating characters 14$^A$, 14$^B$, 14$^C$ and 14$^D$. These flanges are provided with openings for the reception of bolts 15 by means of which the sections A, B and C, D are secured to each other so as to form two assemblies, each comprising a half of the complete cylinder assembly. From Fig. 3 it is apparent that those portions that lie beyond the flanges are so formed that they produce the channel E. This channel has a convex arcuate bottom 16, inclined sides 17 and parallel side portions 18. The two assemblies, each of which consist of the parts A, B and C, D, respectively, are assembled by means of rings 19 to the edges of which the parts A, C and B, D are secured by means of screws 20. The inner surfaces of the rings 19 form the outer walls of the channels F whose side walls 21 are inclined in the same manner as the side walls 17 of the channels E. The sides 21 terminate in parallel surfaces 22. When the four sections A, B, C and D have been assembled in the manner shown and described, a complete cylinder assembly is formed in which there are two circular channels E and F that intersect each other. In the drawing these channels have been shown as being located in planes that intersect each other at right angles but this is not essential and it may even become desirable to have these channels cross each other at some other angle. The channels E and F correspond to the cylinders of an internal combustion engine of the usual type and have operatively associated with them pistons which will be presently described. A ring 23 (Figs. 1, 2, 3 and 6) carries two arcuate pistons 24 and 25 (Fig. 6). These pistons have a transverse section that is exactly the same size and shape as the cross section of the channel E (Fig. 2). The ring 23 has parallel sides that extend inwardly to the line where the inclined sides 17 commence (Figs. 3 and 6) and is provided with circular grooves, on each side, for the reception of rings 26 that engage the sides 18 so as to form a seal. When the ring 23 is in place the channel E becomes a closed circular space that intersects the channel F. Ring 23 has three or more semi-circular spokes 27 that connects it with the hub 28 to which the shaft 8 is secured. This shaft is rotatably mounted in the bearing 7. When the engine is mounted on the base, in the manner shown in Fig. 1, the ring 23 is freely rotatable about the axis of the shaft 8 whereby the pistons 24 and 25 are caused to circulate in the channel E. The pistons 24 and 25 subtend an arc of over 60′ and less than 90 degrees (Fig. 6) and make a substantially gas tight fit with the walls of the channel in which they slide. Secured to the sides of parts A, B, C and D, that lie in planes parallel with a vertical plane passing through the axis of the shaft 8 are bearings brackets 29 and 30. The bracket 29 has a bearing 31 for the reception of one end of the shaft 32 whose other end is rotatably associated with the bearing 33 in bracket 30. Splined to the shaft 32 is a wheel 34 whose rim 35 has its sides grooved for the reception of rings 36 that contact with the flat sides 22 of the channel F (Fig. 3). Extending radially from the rim 35 are pistons 37 and 38 (Figs. 2 and 3) whose length is the same as the length of the pistons 24 and 25 and whose cross section is the same as the cross section of the channel F so as to make a gas tight sliding fit therewith. Secured to the end of the shaft 32 is a gear 39 that meshes with another similar gear 40 on the end of shaft 41. This shaft is journaled in bearings 42 and 43 (Fig. 3) and carries a bevel pinion 44 that meshes with the pinion 45 on the shaft 46. The other end of shaft 46 has a pinion 47 that meshes with a similar pinion on shaft 8. The gear train that transmits power between shafts 8 and 32 has a ratio of one so that the wheel 34 and the ring 23 rotate at exactly the same speed. This wheel and ring are so adjusted relative to each other that pistons 24 and 25 cross the channel F in the interval between the passing of channel E by the rear end of piston 38 (Fig. 2) and the time that the front end of piston 37 reaches the edge of channel E. It will now be evident that if the ring 23 and wheel 34 are rotated by means of any force, as for example, by applying a rotary force to shaft 8 that the pistons will move in the channels and will not interfere with each other. The pistons carried by the ring 23 will cross the channel F during the time that the pistons carried by the wheel 34 move the angular distance of the gap, and vice versa. In order to make the mechanism function as a source of power or as an internal combustion engine it is essential to provide means for taking in a charge of gaseous fuel, compressing the same, exploding and expanding this mixture and then scavenging the explosion chamber.

Figure 5:
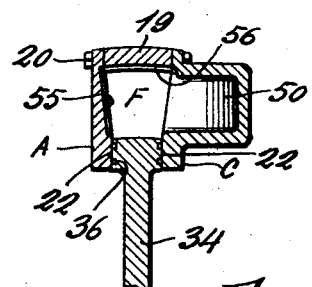
Fig. 5 is a section taken on line 5—5 Fig. 7.

I will now endeavor to explain how this is done. Let us first direct our attention to Fig. 2. From this the relative directions of rotation of the pistons will be seen. The pistons 24 and 25 extend across the channel F and divide this into two substantially semi-circular sections, each of which contains one of the pistons 37 and 38 which move in the direction of the arrows. The front ends of pistons 37 and 38 move towards the pistons 25 and 24 respectively while the rear ends of pistons 37 and 38 are constantly receding from pistons 24 and 25 respectively. We now have four chambers W, W', X and X', of which W and W' are increasing in volume while chambers X and X' are decreasing in volume. Chambers W and W' are the intake chambers and have parts 148 and 49 that are connected with carbureters (not shown) by means of suitable pipes. It is evident that as the pistons rotate a mixture of air and hydrocarbon will be sucked into the intake chambers; it is equally evident that any gases in chambers X and X' will be compressed as the volume of these chambers diminish. Since the engine has two sets of pistons which form two sets of intake, compression and explosion chambers that are duplicates of each other, it will simplify matters somewhat if we consider one set more in detail than the other. We will now direct our attention more particularly to Figs. 7, 8 and 9 and use Figs. 2 and 6 as a guiding means. Figs. 7, 8 and 9 show a chamber 50 that has one end in communication with the compression chamber X and has a spark plug 151. The other end of chamber 50 communicates with the channel E. When the piston 25 is in the position shown in Figs. 7 and 8, it extends across the channel F and closes the outlet from chamber 50 thereby forming with the front end of piston 37 a chamber whose volume is the combined volume of chamber X and 50. As the pistons are continuing to move in the direction of the arrows, chamber X is constantly decreasing in volume. The pistons are so related to each other that the rear end of piston 25 will reach the edge of channel F as the front end of piston 37 reaches the position indicated by the dotted line 51; at this point the explosive charge will be contained in chamber 50 except that part which is between the forward end of piston 37 and the side of piston 25. Any further movement of piston 25 will cause the rear end of this piston to pass the side of the channel F and this will permit that portion of the compressed charge that is contained in the space between the dotted line position of piston 37 and piston 25 to escape into the channel F where most of it will be sucked into the intake chamber W. When the forward end of piston 37 has traveled completely across the channel E the rear end of the piston 25 will be at the point indicated by dotted line 152 in Fig. 9 and any further movement will permit the compressed gases from chamber 50 to enter the space between the rear end of the piston 25 and the side of piston 37 which space forms the explosive chamber. When the parts reach the position shown by full lines in Fig. 9, the mixture is ignited. During the compression of the charge piston 38 has been constantly receding from the side of piston 25 and has drawn in a charge into the space W' which charge will be imprisoned between the pistons 37 and 38 and moved along channel F until one of the pistons (24, 25) crosses the channel F when a portion of the charge will be imprisoned in the chamber X and will be finally compressed into the chamber 50 after which the cycle will be repeated. In Fig. 6 pistons 24 and 25 have been shown substantially in the position indicated in Fig. 8. When piston 25 reaches the position shown in Fig. 9 the charge is exploded and drives it in the direction of the arrow. When the rear end of the piston reaches the end 52 of the exhaust port 53 the gases of combustion will be permitted to escape through pipes 54. The front end of piston 24 when that reaches the position of piston 24 in Fig. 6 will force any remaining exhaust gases out. A suitable ignition mechanism will be provided which will cause the spark plugs to function at proper intervals. I want to call attention to the means provided to balance the pressure on opposite sides of the pistons 37 and 38 during the time that the gases are delivering energy to the pistons 24 and 25. This is shown most clearly in Fig. 5 and consists merely in providing a shallow chamber 55 on the side opposite from chamber 50 and connecting the two by a passage 56.

Although I have illustrated my invention by showing an embodiment in which each channel has operatively associated therewith two arcuate pistons, I want it understood that as many pistons may be employed as may be found desirable. As far as I am aware at present the arrangement shown and described is the most satisfactory.

It will be noted that the walls of the channels have port openings and that these are opened and closed by the pistons as they rotate, whereby the pistons themselves form the valves.

From the above it will be evident that I have produced an internal combustion engine of the rotary type, which is constructed in a novel manner and whose most distinguishing characteristic is that it employs two sets of interconnected pistons that rotate in intersecting planes—one set preparing the charge and compressing the same and the other set converting the energy of the exploding gases into power and then exhausting the gases of combustion. In this engine there are no reciprocating parts and therefore there should be very little vibration. There can be no trouble from preignition as the explosive mixture is not admitted into the heated explosion chamber until the piston is in proper position, and besides this, preignition is not a conceivable objection in a rotary engine of this type.

Having now described my invention, what I claim as new is:

1. An internal combustion engine comprising, in combination, a body member provided with two circular channels lying in intersecting planes, one of said channels having its outer side open and the other having its inner side open, a ring surrounding said body member, said ring having inwardly projecting pistons adapted to cooperate with said outwardly opening channel; a wheel having a rim, said wheel being so mounted that it will rotate in the plane of the inwardly opening channel, piston members projecting radially from said rim, said pistons being adapted to cooperate with the inwardly opening channel and means for positively interconnecting the wheel and ring so that they will be forced to rotate at the same angular velocity.

2. An internal combustion engine comprising, in combination, a body member, two intersection toroidal shaped parts lying in intersecting planes, one of said parts, having a channel opening outwardly, the other part having a channel opening inwardly, said channels intersecting each other at diametrically opposed points, a ring member having inwardly projecting arcuate piston members adapted to cooperate with the outwardly opening channel, a wheel mounted concentric with the inwardly opening channel so as to rotate in the plane of said channel, a plurality of spaced arcuate piston members extending radially from said wheel, said last named pistons being adapted to cooperate with the walls of said inwardly opening channel to divide the latter into separate chambers and means for interconnecting the ring and wheel so as to cause them to rotate with the same angular velocity.

3. An internal combustion engine comprising a body member formed of four separate parts adapted to be assembled so as to form two circular channels of the same diameter and substantially the same transverse cross section, said channels lying in intersecting planes and having coincident centers, one of said channels opening towards the outside and the other opening towards the inside, a ring encircling the channel that opens towards the outside, inwardly projecting arcuate pistons secured to said ring, said pistons extending into said outwardly opening channel, a plurality of spokes secured at one end to said ring and at the other end to a hub, a shaft secured to the hub, said shaft being rotatably supported in a bearing, a wheel mounted for rotation in the plane of the channel that opens inwardly, spaced arcuate pistons secured to the periphery of said wheel and extending into the channel that opens inwardly and means comprising a gear train for connecting the ring and wheel so that they will rotate at the same speed.

In testimony whereof I affix my signature.

HARRISON W. WELLMAN, Jr.